US011808936B2

(12) United States Patent
Handanhal Ramachandra et al.

(10) Patent No.: US 11,808,936 B2
(45) Date of Patent: Nov. 7, 2023

(54) MICRO-ELECTROMECHANICAL SYSTEM (MEMS) BASED TUNABLE POLARIZATION ROTATOR

(71) Applicant: Cisco Technology, Inc., San Jose, CA (US)

(72) Inventors: Sujit Handanhal Ramachandra, Allentown, PA (US); Matthew Stewart Johnson, Breinigsville, PA (US); Trang Thu Pham, Worcester, MA (US); Aidas A. Jakubenas, Canton, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 64 days.

(21) Appl. No.: 17/526,252

(22) Filed: Nov. 15, 2021

(65) Prior Publication Data

US 2023/0152571 A1 May 18, 2023

(51) Int. Cl.
   *G02B 26/00* (2006.01)
   *G02B 27/28* (2006.01)

(52) U.S. Cl.
   CPC ........... *G02B 26/00* (2013.01); *G02B 27/286* (2013.01)

(58) Field of Classification Search
   CPC ...... G02B 26/00; G02B 27/286; G02F 1/0136
   See application file for complete search history.

(56) References Cited

U.S. PATENT DOCUMENTS

| 2002/0031305 A1 | 3/2002 | Ticknor et al. |
| 2002/0172447 A1* | 11/2002 | MacDonald .......... G02F 1/0134 385/11 |
| 2018/0031872 A1 | 2/2018 | Reano et al. |

FOREIGN PATENT DOCUMENTS

| CN | 110780506 A | 2/2020 |
| WO | 2020225484 A1 | 11/2020 |

OTHER PUBLICATIONS

Franck Cholet, et al., "Compact Evanescent Optical Switch and Attenuator with Electromechanical Actuation," IEEE Journal of Selected Topics in Quantum Electronics, vol. 5, No. 1, Jan./Feb. 1999, 8 pages.
Sean P. Anderson, et al., "Silicon Photonic Polarization-Multiplexing Nanotaper for Chip-to-Fiber Coupling," IEEE, Journal of Lightwave Technology, vol. 34, No. 2, Jan. 15, 2016, 7 pages.
(Continued)

*Primary Examiner* — Tina M Wong
(74) *Attorney, Agent, or Firm* — Edell, Shapiro & Finnan, LLC (57) ABSTRACT

A method of rotating polarization of light travelling in a waveguide includes receiving an optical signal having a first polarization state at a first section of the waveguide, the first section of the waveguide being disposed on a plane of a substrate, using a micro-electromechanical system (MEMS) device, angling a second section of the waveguide out of the plane of the substrate, and outputting the optical signal with a second polarization state, different from the first polarization state, on a third section of the waveguide, the third section of the waveguide also being disposed on the plane of the substrate. A control loop is provided to sense the polarization shift to control the angle of the MEMS device to compensate for that shift.

19 Claims, 9 Drawing Sheets

(56) References Cited

OTHER PUBLICATIONS

Qiang Xu, et al., "Electrically tunable optical polarization rotation on a silicon chip using Berry's phase," Nature Coomunications, Nov. 12, 2014, 6 pages.
Ryan J. Patton, et al., "Framework for tunable polarization state generation using Berry's phase in silicon waveguides," Optics Express, vol. 28, No. 14 / Jul. 6, 2020, 13 pages.
Wim Bogaerts, et al., "MORPHIC: Programmable photonic circuits enabled by silicon photonic MEMS," Silicon Photonics XV, 2020, 18 pages.
Sangyoon Han, et al., "Large-scale silicon photonic switches with movable directional couplers," Optica, Optical Society of America, vol. 2, No. 4, Apr. 15, 2015, 6 pages.

* cited by examiner

MICRO-ELECTROMECHANICAL SYSTEM (MEMS) BASED TUNABLE POLARIZATION ROTATOR

TECHNICAL FIELD

The present disclosure relates to managing the polarization of light that has traveled via, e.g., an optical fiber or waveguide.

BACKGROUND

An optical receiver processes an optical signal received over a fiber optic cable. The optical signal may have been modulated, by a transmitter, in amplitude, phase, polarization, or a combination thereof. At the receiver end, the optical signal is typically demodulated using a transducer (e.g., a photodiode or photodetector) that converts the optical (light) signal into a corresponding electrical signal. The corresponding electrical signal is then processed to extract information that was contained in the original optical signal. Modern communication systems use complex modulation schemes, e.g., quadrature modulation, to increase the communication channel efficiency.

The optical receiver, typically implemented as a Photonic Integrated Circuit (PIC), is often designed to operate in transverse electric (TE) polarization mode. Notably, however, when light is propagated in an optical fiber over a distance, the transverse electric/transverse magnetic (TE/TM) polarization fraction of the light undergoes a change. This change may detrimentally impact how well the optical receiver can properly demodulate the optical signal and extract the intended information. One way to minimize the polarization change is to use polarization maintaining fibers (PMFs). However, PMFs can be very expensive and may thus not be a practical option in many implementations.

Traditional polarization splitter rotators (PSRs) can also rotate light to a desirable polarization prior to optical receiver processing, but such devices tend to occupy a lot of area (~200 um in length). In any event, PSRs are not tunable across wavelength and polarization.

DESCRIPTION OF EXAMPLE EMBODIMENTS

Overview

Presented herein is a method of rotating polarization of light travelling in a waveguide. In an embodiment, the method includes receiving an optical signal having a first polarization state at a first section of the waveguide, the first section of the waveguide being disposed on a plane of a substrate, using a micro-electromechanical system (MEMS) device, angling a second section of the waveguide out of the plane of the substrate, and outputting the optical signal with a second polarization state, different from the first polarization state, on a third section of the waveguide, the third section of the waveguide also being disposed on the plane of the substrate . . . .

In another embodiment, an apparatus is provided. The apparatus includes a substrate, a waveguide disposed on the substrate, at least one micro-electromechanical system (MEMS) cantilever disposed under a portion of the waveguide, and configured, when actuated, to displace the portion of the waveguide outside of a plane of remaining portions of the waveguide disposed on the substrate, and a control loop configured to actuate the at least one MEMS cantilever, responsive to polarization of light traveling in the waveguide.

Example Embodiments

Figure 1A:
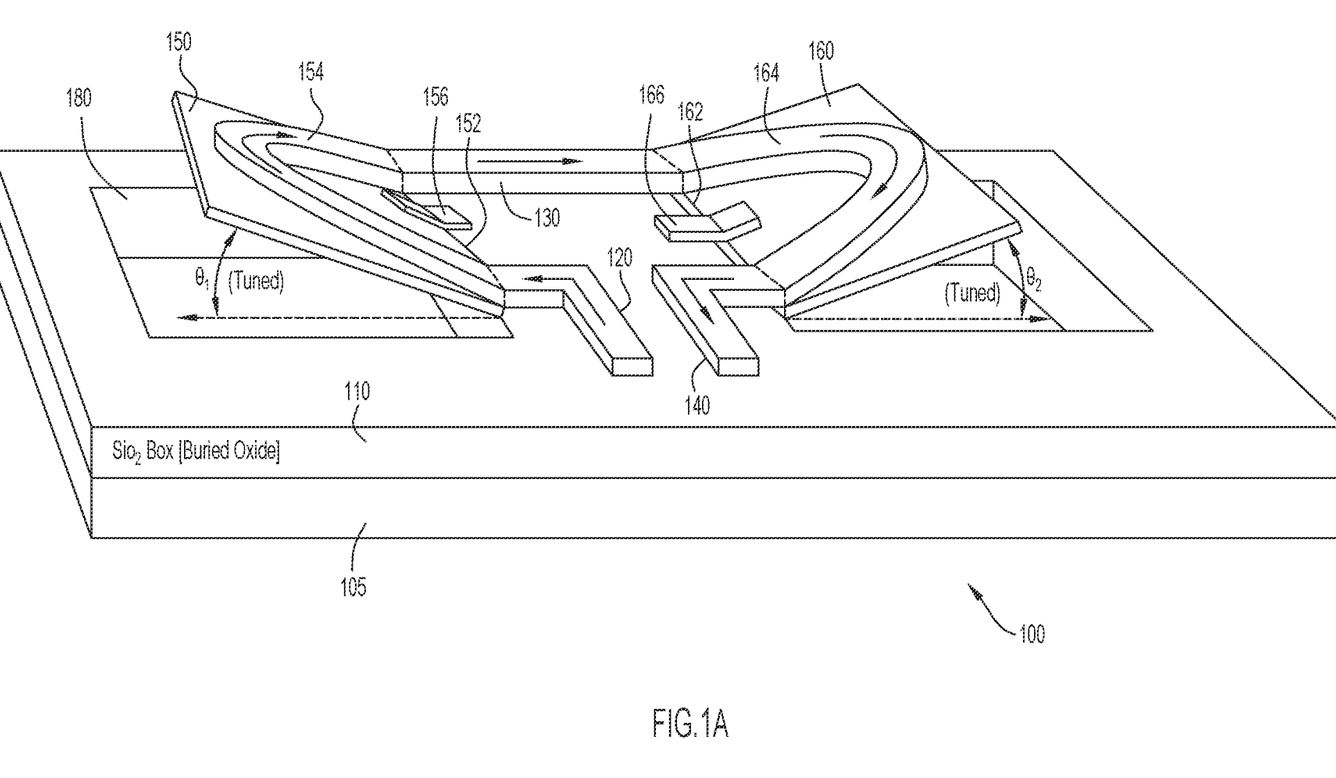
FIG. 1A shows a micro-electromechanical system (MEMS)-based tunable polarization rotator, according to an example embodiment.

FIG. 1A shows a micro-electromechanical system (MEMS)-based tunable polarization rotator 100, according to an example embodiment. A silicon oxide (SiO$_2$) layer 110 is disposed on a substrate 105 (e.g., silicon) and supports an input waveguide 120, a connecting waveguide 130, an output waveguide 140, a first MEMS cantilever 150, and a second MEMS cantilever 160. First MEMS cantilever 150 is attached to SiO$_2$ layer 110 at a first flexible joint 152, and second MEMS cantilever 160 is attached to SiO$_2$ layer 110 at a second flexible joint 162. From a fabrication standpoint, first MEMS cantilever 150 and second MEMS cantilever 160 may be grown on top of a buffer which is then etched away via, e.g., reactive ion etching (RIE) to create an under-cut 180 in SiO$_2$ layer 110, as seen in FIG. 1A. Further, first MEMS cantilever 150 and second MEMS cantilever 160 may be fabricated from piezoelectric material such as, e.g., aluminum nitride, which also happens to be CMOS compatible, thus facilitating fabrication of a PIC with the functionality described herein.

A first curved waveguide section 154 is disposed on a surface of first MEMS cantilever 150, and a second curved waveguide section 164 is disposed on a surface of second MEMS cantilever 160. First curved waveguide section 154 is optically coupled to input waveguide 120 and to one end of connecting waveguide 130. Second curved waveguide section 164 is optically coupled to output waveguide 140 and to another end of connecting waveguide 130. The several waveguides may be fabricated from silicon, for example.

A first electrode 156 straddles first flexible joint 152, and a second electrode 166 straddles second flexible joint 162. Other electrodes (i.e., anodes, which are not shown in FIG. 1A) oppose first electrode 156 and second electrode 166, respectively, and are disposed underneath first MEMS cantilever 150 and second MEMS cantilever 160. When a control voltage is applied, respectively, between the anodes (not shown) and their corresponding first MEMS cantilever 150 and second MEMS cantilever 160, first MEMS cantilever 150 and second MEMS cantilever 160 will displace by tilt angles $\theta_1 1$, $\theta_2$. It is noted that the voltage applied to move, angle, or actuate each of first MEMS cantilever 150 and second MEMS cantilever 160 need not be the same. Likewise, the tilt angles $\theta_1$, $\theta_2$ can be controlled to be different from one another.

The position and the geometry of the electrodes are not critical as long as they function to deform first MEMS cantilever 150 and second MEMS cantilever 160 to attain a desired tilt angle $\theta_1 1$, $\theta_2$, described further below. Hence, several examples of electrode placement can be implemented, as shown in FIGS. 1B and 1C.

Figure 1B:
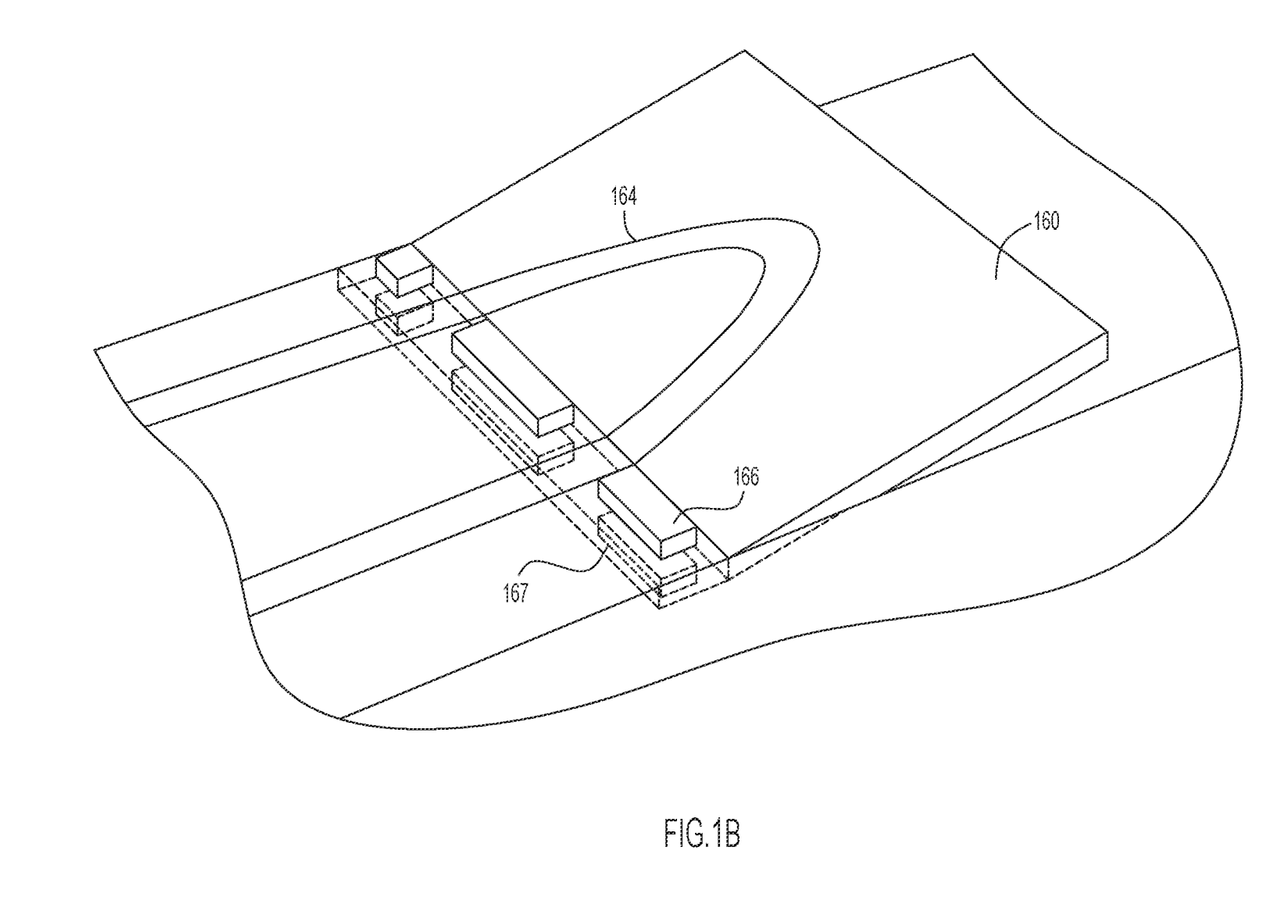
FIGS. 1B and 1C depict different approaches for electrodes to drive MEMS cantilevers of the MEMS-based tunable polarization rotator, according to an example embodiment.

In FIG. 1B, electrodes 166, 167 sandwich the piezo cantilever only on a flat portion of the piezoelectric material. This design may be advantageous when electrodes 166, 167 are made of inflexible materials.

Figure 1C:
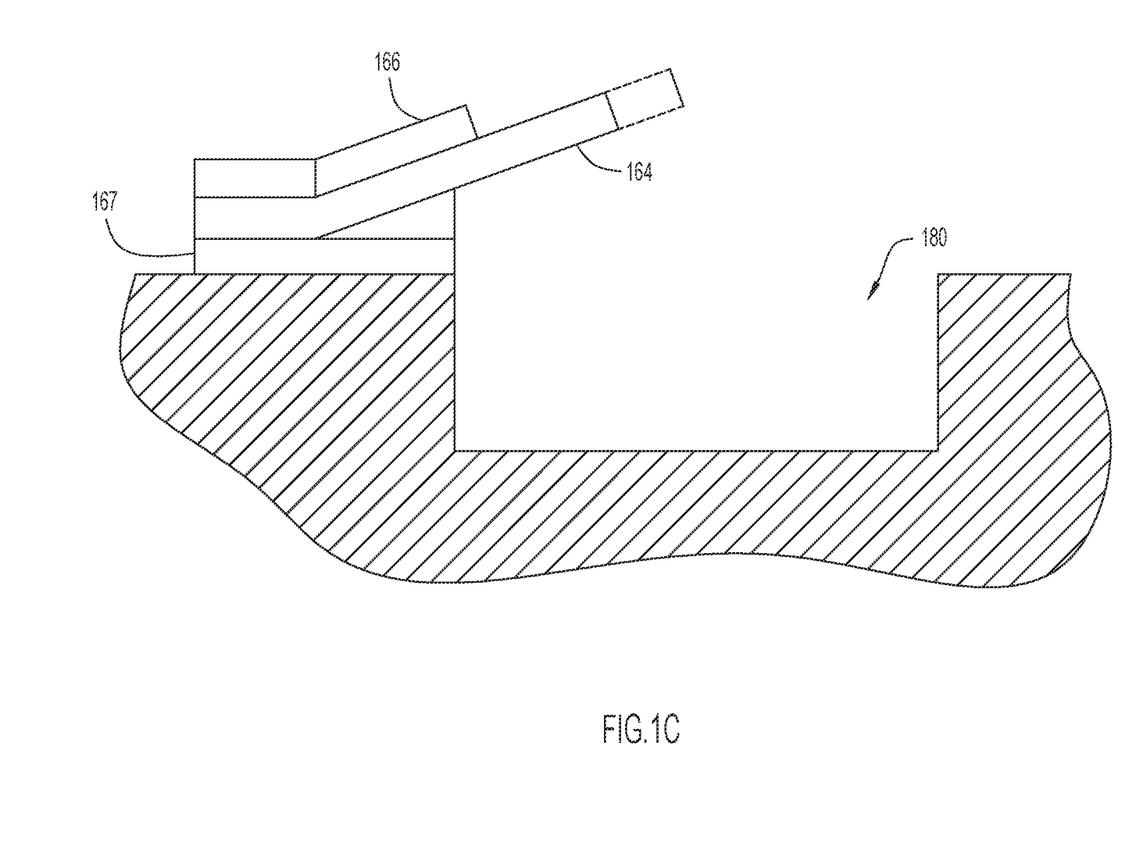

In FIG. 1C, the electrodes extend onto a portion of the MEMS cantilever 160 which bends. This design makes more sense when electrodes are flexible (polymer, doped III-V etc.). In this embodiment, electrode 167 lies flat, but could also be flexible.

The discussion above is also applicable to electrode 156, and its corresponding anode (not shown).

It is noted the stack up used for the platform described above can vary. For example, the MEMS-based tunable polarization rotator 100 can be implemented with different materials. For instance, the substrate 105 could be SiC, III-V materials, etc. This would then be accompanied by a change in the cladding from $SiO_2$ to another III-V material, a polymer, perovskite, air, etc. The waveguides may then be fabricated from a material with high refractive index such as Lithium Niobate, $BaTiO_3$, III-V materials, etc. The piezoelectric material used could also vary to include quartz, Lithium Niobate ($LiNbO_3$), Lead Zirconate Titanate (PZT), Potassium Niobate ($KNbO_3$), Sodium Tungstate ($Na_2WO_3$), group III-V semiconductors, group II-VI semiconductors, etc. The primary requirement for the piezoelectric material is that it exhibits a mechanical deformation when subjected to an electric field.

Further, the fabrication of MEMS-based tunable polarization rotator 100 may vary depending on the materials involved. Generally, the materials may be grown in epitaxial layers or with a portion of a material stack grown separately and transferred onto a primary stack by techniques such as bonding, transfer printing, etc.

The operation of the MEMS-based tunable polarization rotator 100 may be understood as follows:

One or both of the first MEMS cantilever 150 and the second MEMS cantilever 160 are angled or actuated via first electrode 156 and/or second electrode 166 (and corresponding anodes) to control the tilt angles $\theta_1$, $\theta_2$.

When light travels via the input waveguide 120, first curved waveguide section 154, connecting waveguide 130, second curved waveguide section 164, and output waveguide 140, the light will travel out of plane (i.e., out of a plane of substrate 105) on one or both of first curved waveguide section 154 and/or second curved waveguide section 164 such that, due to the principle known as Berry's phase, the polarization of the light will shift by up to 90° if the total out of plane tilt angle $\theta_1$ plus tilt angle $\theta_2$ is 45°. That is, as light passes along first curved waveguide section 154 and/or second curved waveguide section 164, which is/are arranged to be out-of-plane, the polarization of the light in the waveguide may convert fully from TM mode to TE mode (assuming the light entering the input waveguide 120 is in TM mode). The light may also be converted to TM mode from TE mode, and combinations of TE/TM ratios, as desired, based on the selection of tilt angles $\theta_1$, $\theta_2$ and the polarization of the light input to MEMS-based tunable polarization rotator 100. In other words, by operating or actuating, i.e., angling, the first MEMS cantilever 150 and/or the second MEMS cantilever 160, it is possible to control the polarization of the light signal to a desired state.

In an embodiment, and as shown in FIG. 1A, two MEMS cantilevers, i.e., first MEMS cantilever 150 and second MEMS cantilever 160, are employed to achieve, in combination, a full 45° ($\theta_1$ plus $\theta_2$), e.g., 22.5° each. However, those skilled in the art will appreciate that a single MEMS cantilever and associated curved waveguide may be sufficient, in some implementations, to achieve the desired polarization rotation.

Theoretically, by controlling tilt angles $\theta_1$ and $\theta_2$ with first MEMS cantilever 150 and second MEMS cantilever 160, tuning over the entire Poincaré sphere is possible.

Figure 2:
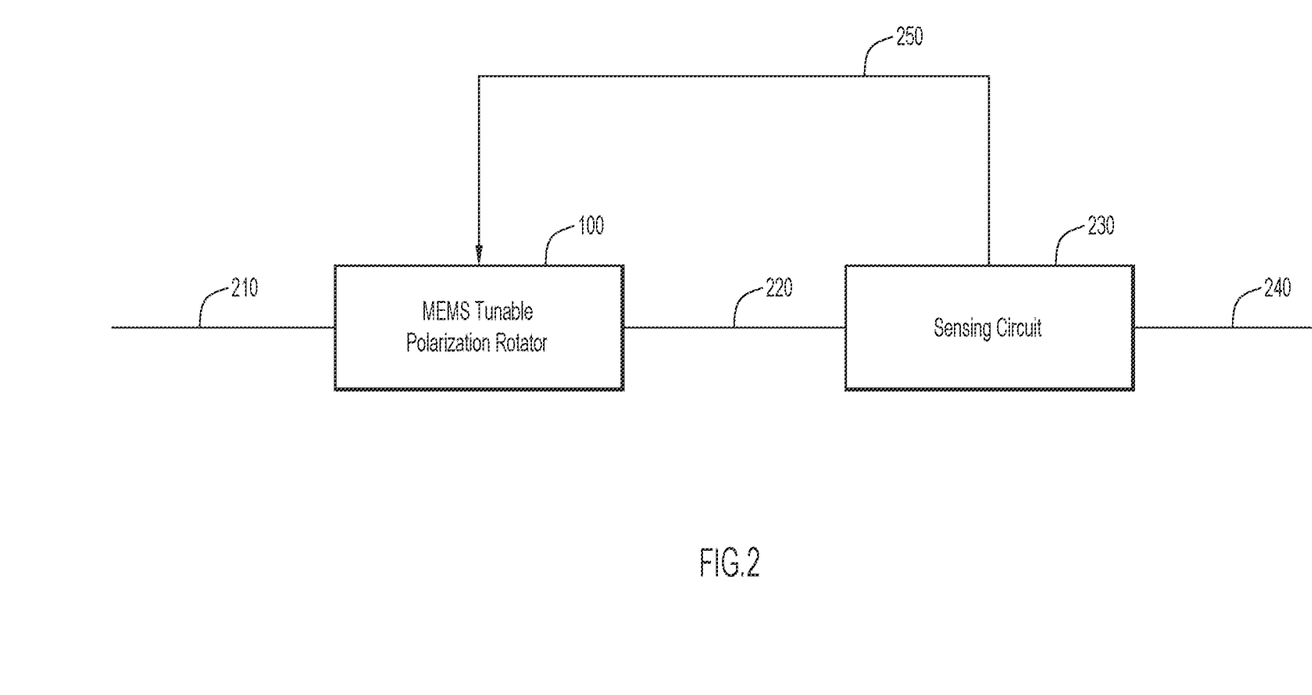
FIG. 2 shows a high-level feedback mechanism for controlling the MEMS-based tunable polarization rotator, according to an example embodiment.

FIG. 2 shows a high-level feedback mechanism or control loop for controlling the MEMS-based tunable polarization rotator 100, according to an example embodiment. Specifically, FIG. 2 shows an input 210 for a light signal, MEMS-based tunable polarization rotator 100, an intermediate output 220 that feeds a sensing circuit 230, and an output 240 via which the light signal is passed to follow-on optical components. A feedback loop 250 connects sensing circuit 230 to MEMS-based tunable polarization rotator 100, and provides, e.g., voltage signal(s) to drive first MEMS cantilever 150 and/or second MEMS cantilever 160 to the desired tilt angles $\theta_1$ and $\theta_2$. That is, sensing circuit 230 is configured to sense the TE/TM ratio of the light signal carried by intermediate output 220, and further configured to, responsively, send feedback signals to MEMS-based tunable polarization rotator 100 to cause MEMS-based tunable polarization rotator 100 to adjust the polarization of the light signal by actuating first MEMS cantilever 150 and/or second MEMS cantilever 160. Dynamic polarization variations can be handled in real time with a transient response bandwidth limited mainly by the MEMS cantilever actuation time.

Thus, a control loop, including feedback loop 250, is meant to sense the polarization state of the incoming optical mode from the MEMS-based tunable polarization rotator 100 and determine the amount of shift needed to correct the polarization based on a given desired polarization state (e.g., 100% TE, 100% TM, a combination of both, etc.). The polarization state can be sensed in several ways, including using birefringent waveguides and a polarization splitter.

Figure 3A:
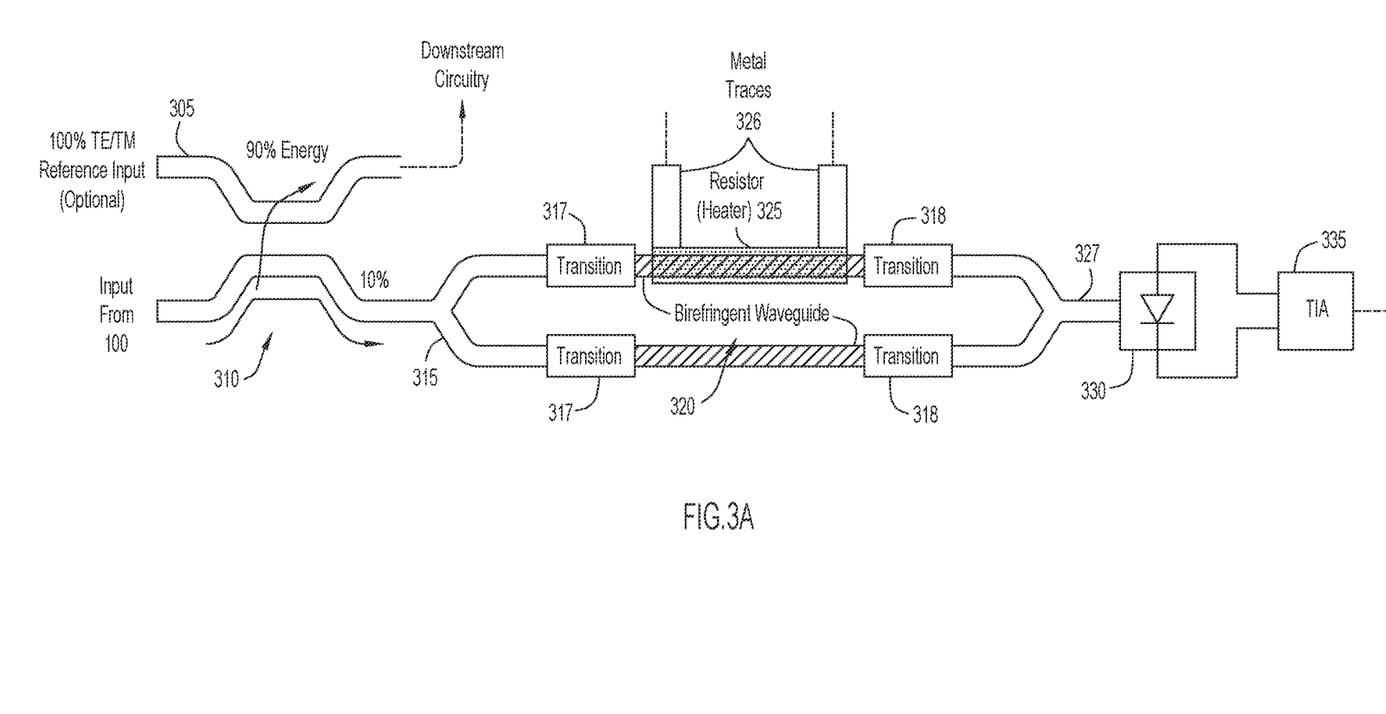
FIG. 3A shows an approach to detect a phase, and thus TE/TM polarization fraction, of an optical signal to use as part of the feedback mechanism for controlling the MEMS-based tunable polarization rotator, according to an example embodiment.
Figure 3B:
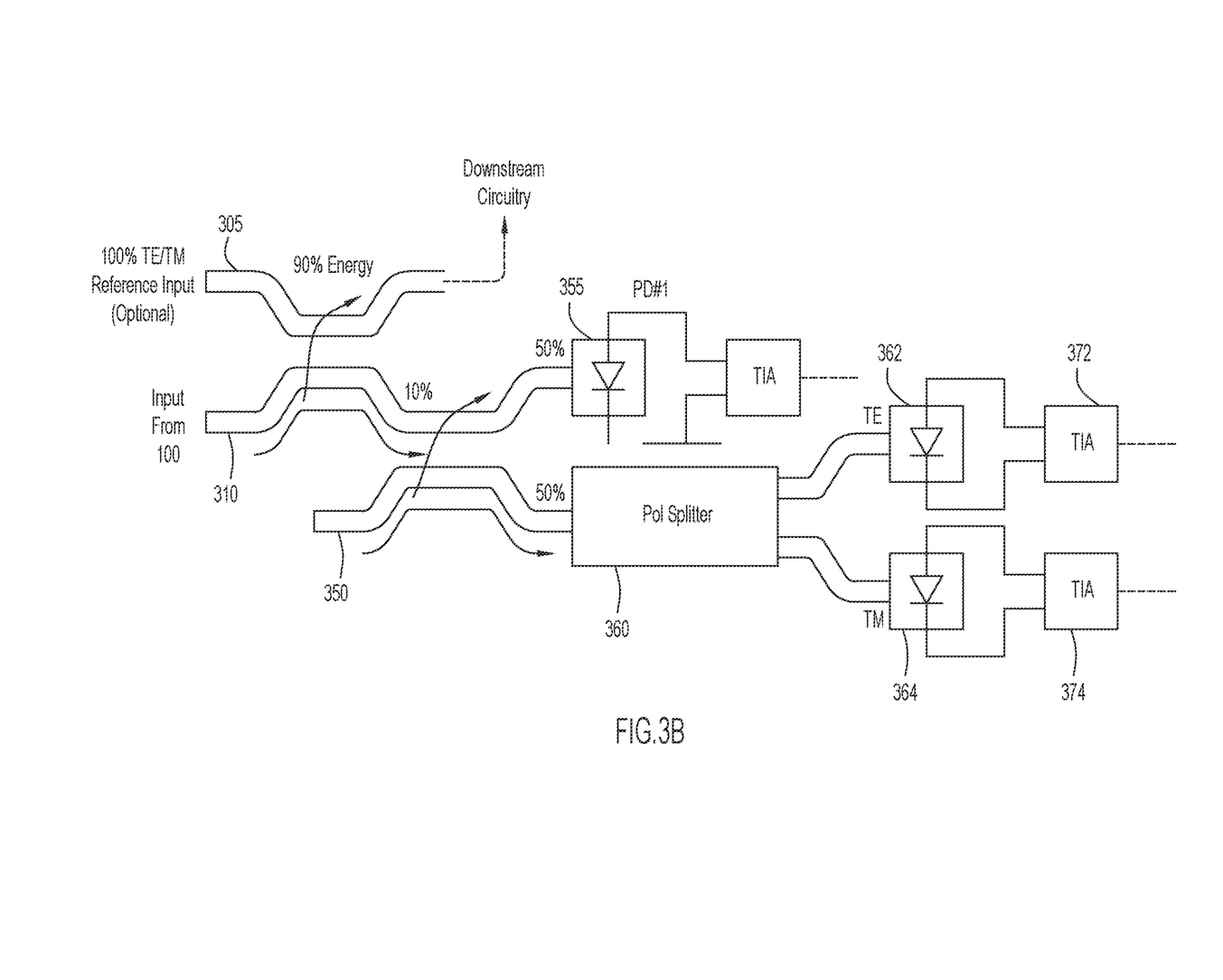
FIG. 3B shows the use of a polarization splitter to sense TE/TM polarization fraction, of an optical signal to use as part of the feedback mechanism for controlling the MEMS-based tunable polarization rotator, according to an example embodiment.

FIGS. 3A and 3B show approaches to detect a phase, and thus TE/TM polarization fraction, of an optical signal to use to as part of the feedback mechanism for controlling the MEMS-based tunable polarization rotator, according to an example embodiment. The structures shown in FIGS. 3A and 3B may be used as part of an initial calibration of the system. Using the result as a "bias" point, a control loop, like that shown in FIG. 2, can then fine tune the polarization in real time. Thus, the circuits of FIGS. 3A and 3B could be one aspect of an implementation of sensing circuit 230 in FIG. 2.

As suggested in FIG. 3A, the optical mode from the rotator enters the control loop circuit shown below and passes through an adiabatic 2×2 (i.e., power splitter 310). The power splitter 310 splits incoming power in the ratio of 1:9 or 1:19 etc. Instead of power splitter 310, a multi-mode interferometer (MMI), Y-branch, tap coupler, etc. could also be used.

Most of the power is directed to the optical circuit downstream. A small fraction is then directed into a Y-branch 315, which divides the signal power into two waveguides (50% each). A transition 317 is then employed to match the modes in the input waveguide and the birefringent waveguide used in the next stage. The purpose of this is to prevent any energy loss by adiabatically transforming the optical mode in the input waveguide to the mode in the birefringent waveguide and minimize scattering and back reflections.

The two arms containing the birefringent waveguide function as a VOA (variable optical attenuator) 320. One of the arms is equipped with a heater 325 and when a current is passed through this heater (basically a resistor made of metal traces 326, doped Si etc.), the temperature of one arm increases. This causes a shift in the refractive index as compared to the other identical arm. A birefringent waveguide essentially means that the waveguide material exhibits different refractive indices for TE and TM modes in the absence of geometric dispersion (waveguide is wide and tall enough (square cross section)).

The temperature increase further causes a variation in these indices via the thermo optic coefficient of the material. Thus, the phase of the mode changes. At the output of the VOA 320, the mode passes through transitions 318 and is combined in a y-combiner 327 (e.g., MMI, 2×2, tap coupler, etc.) and the amplitude is measured using a photodiode 330. A transimpedance amplifier (TIA) 335 converts the output current of photodiode 330 into a sizable voltage which the electrical circuit can then process.

Knowing the output amplitude, one can estimate the phase shift observed. And knowing the phase shift and the temperature increase (using a temp. sensor/calculating estimate based on electrical power input), one can determine the change in the material refractive index. Since the thermo-optic coefficient is well-known, it is then possible to calculate the relative percentage of TE/TM fields in the optical mode. For example, knowing the phase difference between the legs, it is possible to calculate $\Delta\Phi=\lambda/2\Delta\eta_{eff}$. Therefore, $\Delta\eta_{eff}=\lambda/2\Delta\Phi$. With $\Delta\eta_{eff}$ it is then possible to estimate $\eta_{eff}$ (effective refraction). Using $\eta_{eff}$, one can then estimate polarization.

The 100% TE/ 100% TM reference 305 at the input of is meant for calibration of this control loop (characterizing the birefringence etc.) if a suitable laser source is available.

FIG. 3B shows the use of a polarization splitter to sense TE/TM polarization fraction, of an optical signal to use as part of the feedback mechanism for controlling the MEMS-based tunable polarization rotator 100, according to an example embodiment. As shown, the optical mode from the MEMS-based tunable polarization rotator 100 enters the control loop circuit and passes through adiabatic 2×2 power splitter 310. Power splitter 310 splits incoming power in the ratio of 1:9 or 1:19 etc. Instead of a 2×2 power splitter, an MMI, Y-branch, tap coupler, etc. can be used.

Most of the power is directed to the optical circuit downstream. A small fraction is then directed into a 2×2 power splitter 350 which divides the signal power into two waveguides (50% each). One of the arms is terminated using a photodiode 355 to measure the optical intensity (as a reference). Photodiode 355 should have the same responsivity across different polarizations.

The other arm is directed into a polarization splitter 360 which separates the TE and TM fields and each of these waveguides is then terminated with a respective photodiode 362, 364 to measure the optical power in the TE fields and the TM fields. Outputs of photodiodes 362, 364 are provided to TIAs 372, 374. This directly provides the TE/TM ratio.

The bandwidth of the control loop depends on the photodiode bandwidth, any propagation delay in the electrical circuit and the settling time of the MEMS cantilever.

Figure 4:
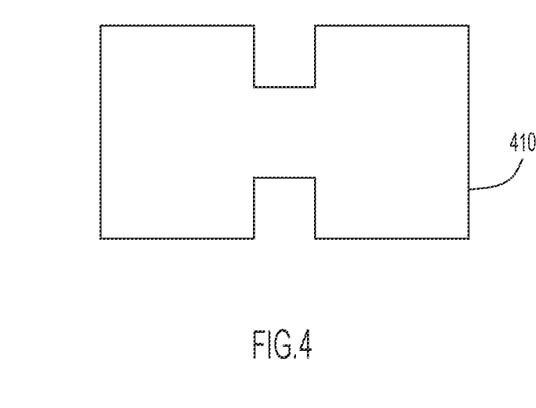
FIG. 4 shows a slotted waveguide that can be used to dampen TM polarization to calibrate the MEMS-based tunable polarization rotator, according to an example embodiment.

FIG. 4 shows a slotted waveguide 410 (cross section) that can be used to dampen TM mode polarization to calibrate the MEMS-based tunable polarization rotator 100, according to an example embodiment. More specifically, for purposes of calibration, polarization of a light signal is varied to calibrate, initially, based on amplitude detected at, e.g., a photodiode. Since the slotted waveguide dampens TM mode, and passes TE mode, it can be discerned that the mode is 100% quasi-TE when the amplitude detected is maximum.

Figure 5:
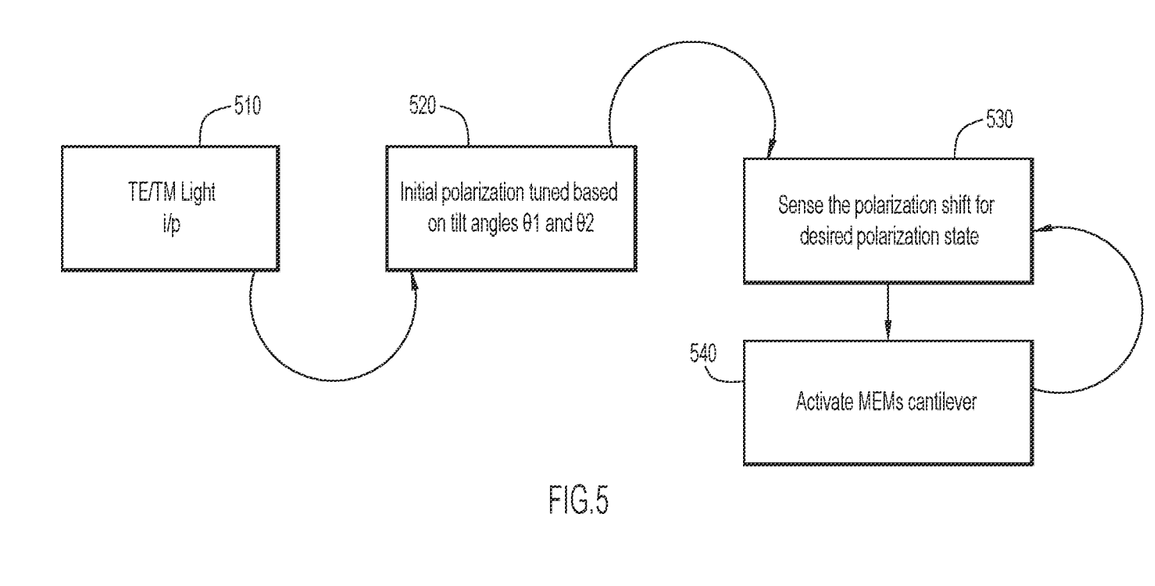
FIG. 5 shows a flowchart for controlling the MEMS-based tunable polarization rotator, according to an example embodiment.

FIG. 5 shows a flowchart for controlling the MEMS-based tunable polarization rotator 100, according to an example embodiment. At 510, TE/TM light is input to the MEMS-based tunable polarization rotator 100. At 520, initial polarization is tuned based on tilt angles $\theta_1$ and $\theta_2$. At 530, a polarization shift for desired polarization state is sensed, i.e., determined. Stated alternatively, at 530, the current polarization is sensed to determine a desired shift to be applied by the EMS-based tunable polarization rotator 100. And, at 540, one or more MEMS cantilevers are actuated to achieve the desired polarization rotation.

Thus, those skilled in the art will appreciate that the embodiments described herein provide a MEMS actuated, tunable, chip-scale polarization converter based on out-of-plane waveguides and Berry's phase. The MEMS-based tunable polarization rotator 100 is wavelength insensitive, has a small form factor and can be used to eliminate the use of PMFs in data center switches and to design chip-scale sensors.

Figure 6:
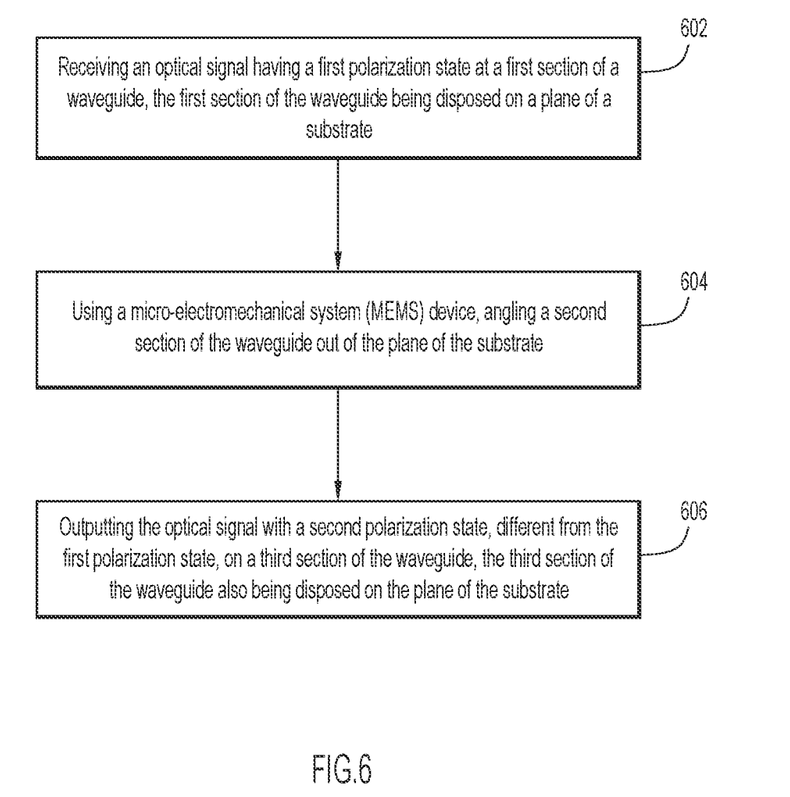
FIG. 6 is a flowchart for operating the MEMS-based tunable polarization rotator, according to an example embodiment.

FIG. 6 is a flowchart for operating the MEMS-based tunable polarization rotator 100, according to an example embodiment. At 602, an operation includes receiving an optical signal having a first polarization at a first section of a waveguide, the first section of the waveguide being disposed on a plane of a substrate. At 604, an operation includes, using a micro-electromechanical system (MEMS) device, angling a second section of the waveguide out of the plane of the substrate. And, at 606, an operation includes outputting the optical with a second polarization, different from the first polarization, on a third section of the waveguide, the third section of the waveguide also being disposed on the plane of the substrate.

Figure 7:
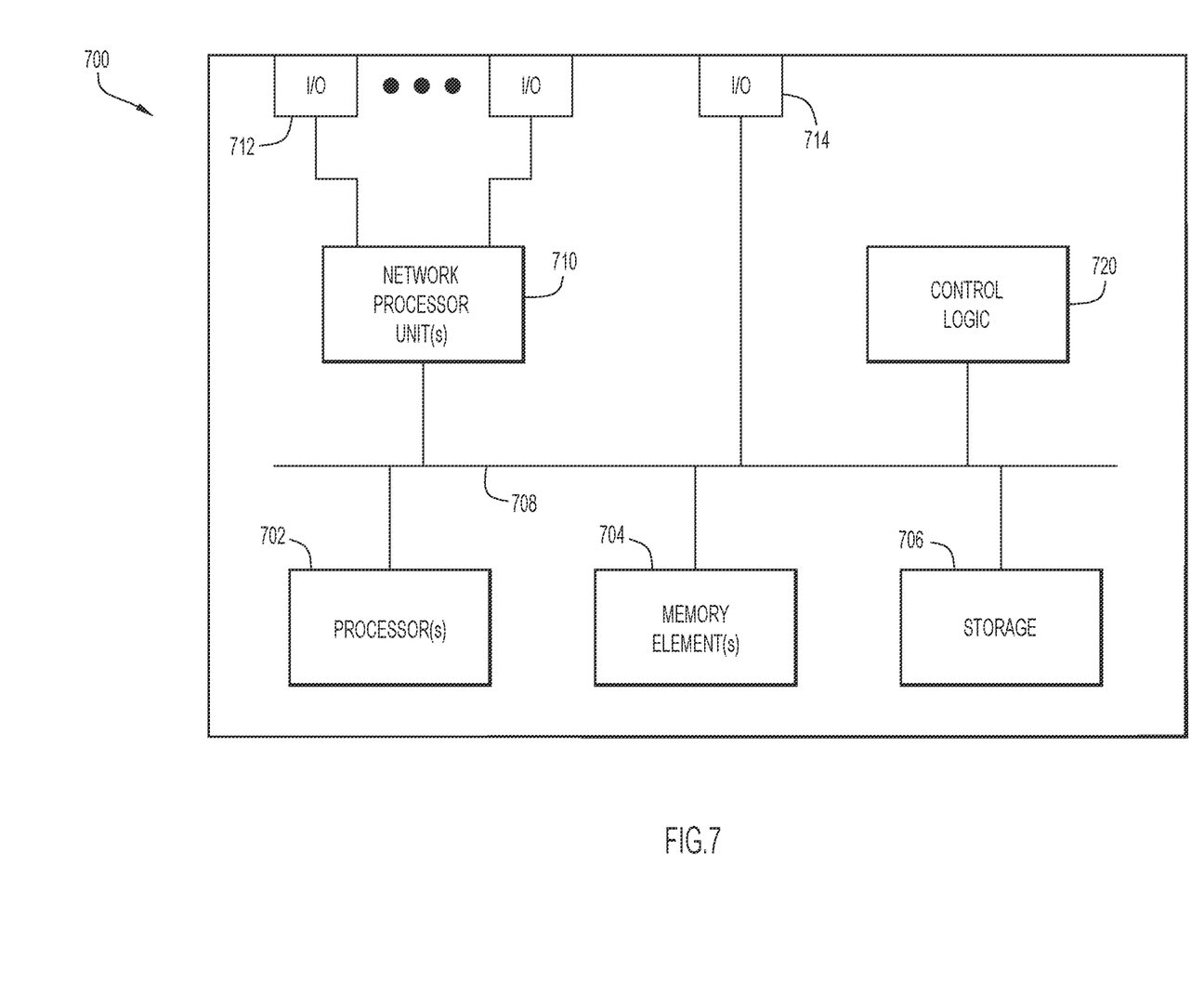
FIG. 7 illustrates a hardware block diagram of a computing device that may leverage the MEMS-based tunable polarization rotator as part of its I/O function, according to an example embodiment.

FIG. 7 illustrates a hardware block diagram of a computing device that may leverage the MEMS-based tunable polarization rotator 100 as part of its I/O function, according to an example embodiment. In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein. MEMS-based tunable polarization rotator 100 could be implemented in, e.g., network (I/O) interface(s) 712.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include, but not limited to, any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, a method is provided. The method may include receiving an optical signal having a first polarization state at a first section of a waveguide, the first section of the waveguide being disposed on a plane of a substrate, using a micro-electromechanical system (MEMS) device, angling a second section of the waveguide out of the plane of the substrate, and outputting the optical signal with a second polarization state, different from the first polarization state, on a third section of the waveguide, the third section of the waveguide also being disposed on the plane of the substrate.

In the method, the first polarization state is a first transverse electric (TE) mode and transverse magnetic (TM) mode ratio, and the second polarization state is a second TE mode and TM mode ratio.

The method may further include angling the second section of the waveguide by actuating a piezo-electric material on which the second section of the waveguide is disposed.

The angling may be up to 22.5 degrees, or up to 45 degrees.

The method may further include angling a fourth section of the waveguide out of the plane of the substrate.

In the method, a sum of a first angle of the second section of the waveguide and a second angle of the fourth section of the waveguide is up to at least 45 degrees.

In the method, angling the second section of the waveguide out of the plane of the substrate may be executed during a calibration operation.

The method may further include leveraging waveguide birefringence as part of the calibration operation.

The method may also include receiving a feedback signal indicative of polarization state, and angling the second section of the waveguide out of the plane of the substrate in response to the feedback signal.

In another embodiment, an apparatus is provided. The apparatus may include a substrate, a waveguide disposed on the substrate, a micro-electromechanical system (MEMS) cantilever disposed under a portion of the waveguide, and configured, when actuated, to displace the portion of the waveguide outside of a plane of remaining portions of the waveguide disposed on the substrate, and a control loop configured to actuate the MEMS cantilever, responsive to polarization of light traveling in the waveguide.

The substrate may be comprised of silicon.

The MEMS cantilever may be comprised of piezoelectric material.

The piezoelectric material may be comprised of aluminum nitride, quartz, Lithium Niobate (LiNbO$_3$), Lead Zirconate Titanate (PZT), Potassium Niobate (KNbO$_3$), Sodium Tungstate (Na$_2$WO$_3$).

The MEMS cantilever may be configured to be displaced out of the plane of remaining portions of the waveguide by up to at least 22.5 degrees.

The apparatus may further include a second MEMS cantilever having disposed thereon another portion of the waveguide, and configured, when actuated, to displace the another portion of the waveguide outside of the plane of remaining portions of the waveguide disposed on the substrate.

In still another embodiment, an apparatus is provided and includes a substrate, a waveguide disposed on the substrate, a first micro-electromechanical system (MEMS) cantilever disposed under a first curved portion of the waveguide, and configured, when actuated, to displace the first curved portion of the waveguide outside of a plane of remaining portions of the waveguide disposed on the substrate, a second MEMS cantilever disposed under a second curved portion of the waveguide, and configured, when actuated, to displace the second curved portion of the waveguide outside of the plane of remaining portions of the waveguide disposed on the substrate, and electrodes disposed on the first MEMS cantilever and the second MEMS cantilever via which a voltage may be applied to actuate the first MEMS cantilever and the second MEMS cantilever.

The apparatus may also include a control loop configured to actuate the first MEMS cantilever and the second MEMS cantilever, responsive to a polarization state of light traveling in the waveguide.

In the apparatus, the first MEMS cantilever and the second MEMS cantilever may be comprised of piezoelectric material.

The piezoelectric material may be comprised of aluminum nitride, quartz, Lithium Niobate (LiNbO$_3$), Lead Zirconate Titanate (PZT), Potassium Niobate (KNbO$_3$), Sodium Tungstate (Na$_2$WO$_3$).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   receiving an optical signal having a first polarization state at a first section of a waveguide, the first section of the waveguide being disposed on a plane of a substrate;
   using a micro-electromechanical system (MEMS) device, angling a second section of the waveguide out of the plane of the substrate, the second section of the waveguide being U-shaped; and
   outputting the optical signal with a second polarization state, different from the first polarization state, on a third section of the waveguide, the third section of the waveguide also being disposed on the plane of the substrate.

2. The method of claim 1, wherein the first polarization state is a first transverse electric (TE) mode and transverse magnetic (TM) mode ratio, and the second polarization state is a second TE mode and TM mode ratio.

3. The method of claim 1, further comprising angling the second section of the waveguide by actuating a piezo-electric material on which the second section of the waveguide is disposed.

4. The method of claim 1, further comprising angling the second section of the waveguide up to 22.5 degrees.

5. The method of claim 1, further comprising angling the second section of the waveguide up to 45 degrees.

6. The method of claim 1, further comprising angling a fourth section of the waveguide out of the plane of the substrate.

7. The method of claim 6, wherein a sum of a first angle of the second section of the waveguide and a second angle of the fourth section of the waveguide is up to at least 45 degrees.

8. The method of claim 1, wherein angling the second section of the waveguide out of the plane of the substrate is executed during a calibration operation.

9. The method of claim 8, further comprising using waveguide birefringence as part of the calibration operation.

10. The method of claim 1, further comprising receiving a feedback signal indicative of polarization state; and
angling the second section of the waveguide out of the plane of the substrate in response to the feedback signal.

11. An apparatus comprising:
a substrate;
a waveguide disposed on the substrate;
a micro-electromechanical system (MEMS) cantilever disposed under a portion of the waveguide, and configured, when actuated, to displace the portion of the waveguide outside of a plane of remaining portions of the waveguide disposed on the substrate; and
a control loop configured to actuate the MEMS cantilever, responsive to polarization of light traveling in the waveguide.

12. The apparatus of claim 11, wherein the substrate is comprised of silicon.

13. The apparatus of claim 11, wherein the MEMS cantilever is comprised of piezoelectric material.

14. The apparatus of claim 13, wherein the piezoelectric material is aluminum nitride.

15. The apparatus of claim 11, wherein the MEMS cantilever is configured to be displaced out of the plane of remaining portions of the waveguide by up to at least 22.5 degrees.

16. The apparatus of claim 11, further comprising a second MEMS cantilever having disposed thereon another portion of the waveguide, and configured, when actuated, to displace the another portion of the waveguide outside of the plane of remaining portions of the waveguide disposed on the substrate.

17. An apparatus comprising:
a substrate;
a waveguide disposed on the substrate;
a first micro-electromechanical system (MEMS) cantilever disposed under a first curved portion of the waveguide, and configured, when actuated, to displace the first curved portion of the waveguide outside of a plane of remaining portions of the waveguide disposed on the substrate;
a second MEMS cantilever disposed under a second curved portion of the waveguide, and configured, when actuated, to displace the second curved portion of the waveguide outside of the plane of remaining portions of the waveguide disposed on the substrate;
electrodes disposed on the first MEMS cantilever and the second MEMS cantilever via which a voltage may be applied to actuate the first MEMS cantilever and the second MEMS cantilever; and
a control loop configured to actuate the first MEMS cantilever and the second MEMS cantilever, responsive to a polarization state of light traveling in the waveguide.

18. The apparatus of claim 17, wherein the first MEMS cantilever and the second MEMS cantilever are comprised of piezoelectric material.

19. The apparatus of claim 18, wherein the piezoelectric material is aluminum nitride.

* * * * *